Nov. 7, 1933.                 H. S. COE                 1,934,406
                     SEPARATING APPARATUS AND METHOD
                         Filed Aug. 18, 1930           3 Sheets-Sheet 1
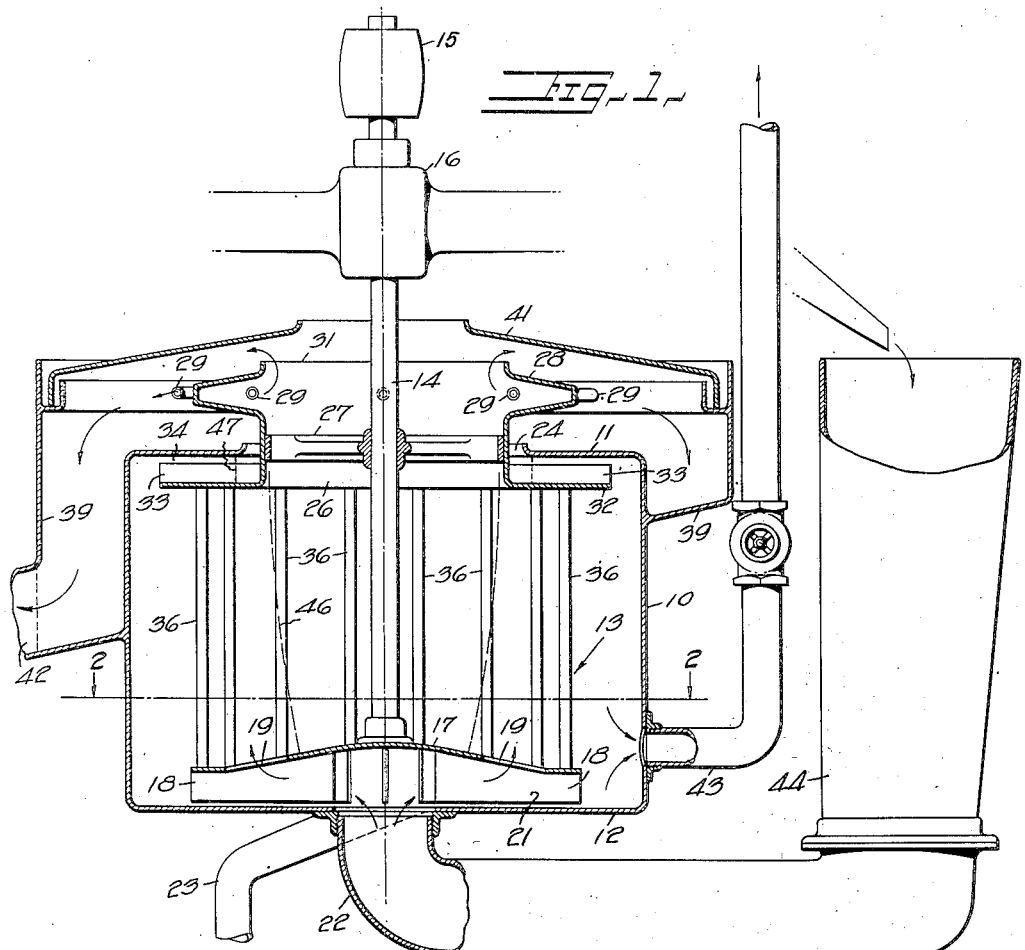
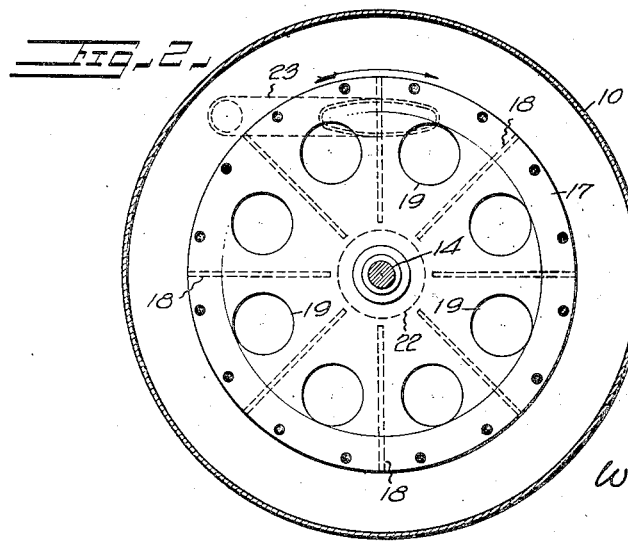
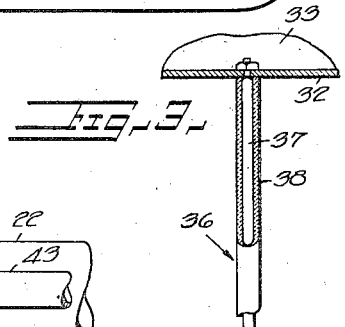
INVENTOR.
HARRISON S. COE
BY White, Prost, Fleke & Lothrop
ATTORNEYS.

Nov. 7, 1933.  H. S. COE  1,934,406
SEPARATING APPARATUS AND METHOD
Filed Aug. 18, 1930    3 Sheets-Sheet 2

INVENTOR.
HARRISON S. COE
BY White, Prost, Fletcher & Lothrop
ATTORNEYS.

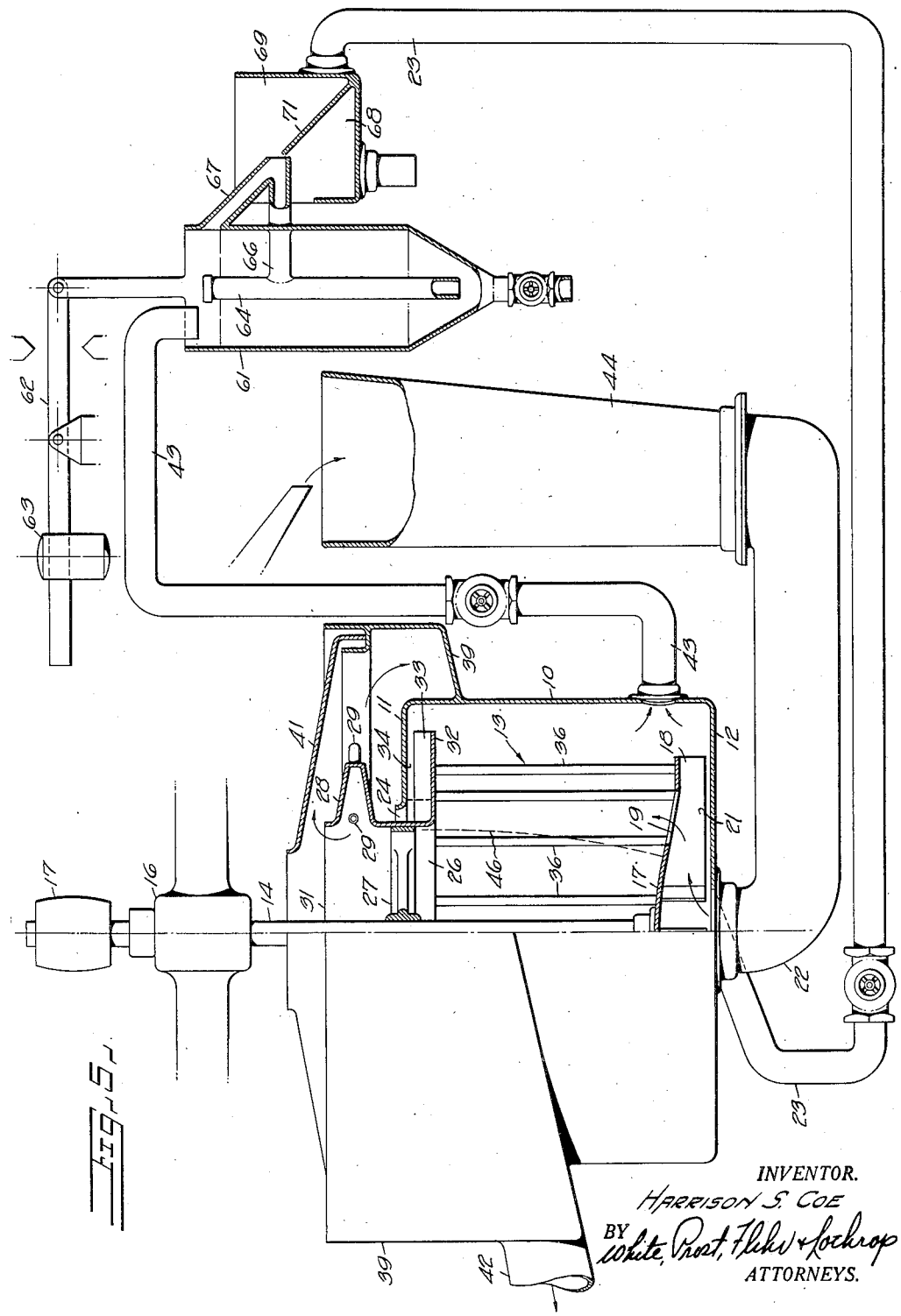

Patented Nov. 7, 1933

1,934,406

UNITED STATES PATENT OFFICE 1,934,406

SEPARATING APPARATUS AND METHOD

Harrison S. Coe, Palo Alto, Calif.

Application August 18, 1930. Serial No. 476,004

12 Claims. (Cl. 209—161)

This invention relates generally to apparatus and methods for the classification or separation of coarser solids from fine solids held in a liquid suspension, as for example the separation of sand from lubricating mud used in drilling oil wells or the classifying or separating out of a fraction of granular material from ore pulp.

It is an object of the invention to devise apparatus of the above character which can be operated continuously without becoming clogged, which will be relatively simple in mechanical construction, and which can be maintained in proper operating condition without frequent servicing and with a minimum of manual attention.

It is a further object of the invention to devise centrifugal separating apparatus which can be utilized upon feed materials containing gritty components such as sand, without the use of the customary rotary centrifuge bowl.

It is a further object of the invention to devise a novel method or process for effecting separation or classification of coarser solids from fluid feed materials, which can be carried out by the use of a minimum of equipment, and which will give a classification or separation sufficiently complete for many practical purposes, as for example for de-sanding circulating mud employed in the drilling of oil wells.

Further objects of the invention will appear from the following description in which the preferred embodiment of the invention has been set forth in conjunction with the accompanying drawings. It is to be understood that the appended claims are to be accorded a range of equivalents consistent with the state of the prior art.

Referring to the drawings:

Figure 1 is a side elevational view in cross section illustrating centrifuge apparatus incorporating the present invention.

Fig. 2 is a cross sectional view taken along the line 2—2 of Fig. 1.

Fig. 3 is a detail partly in cross section illustrating the construction of one of the members for connecting the diaphragms of the rotor.

Fig. 5 is a side elevational view, partly in cross section, illustrating a system incorporating the centrifuge apparatus of Fig. 1, and also incorporating a specific gravity testing device.

Figure 6:
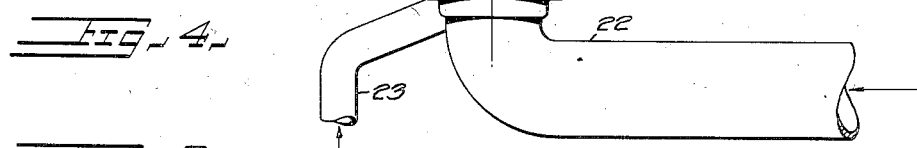
Figure 7:
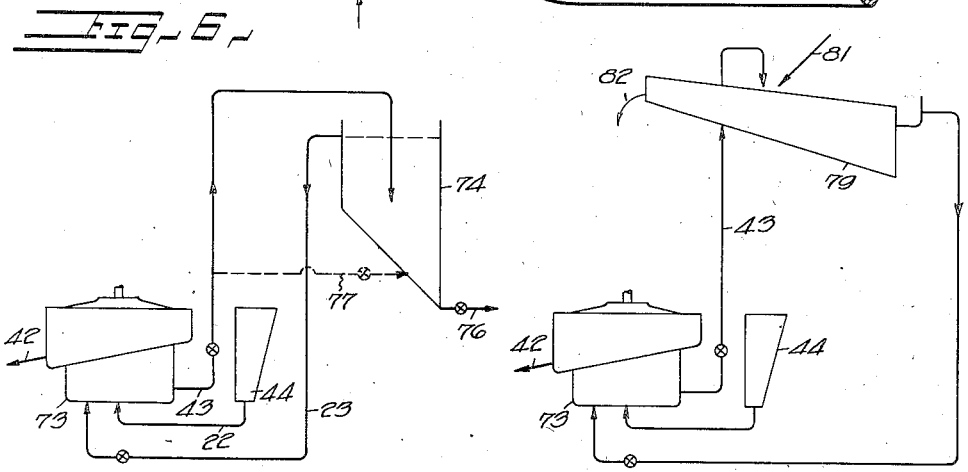
Figure 8:
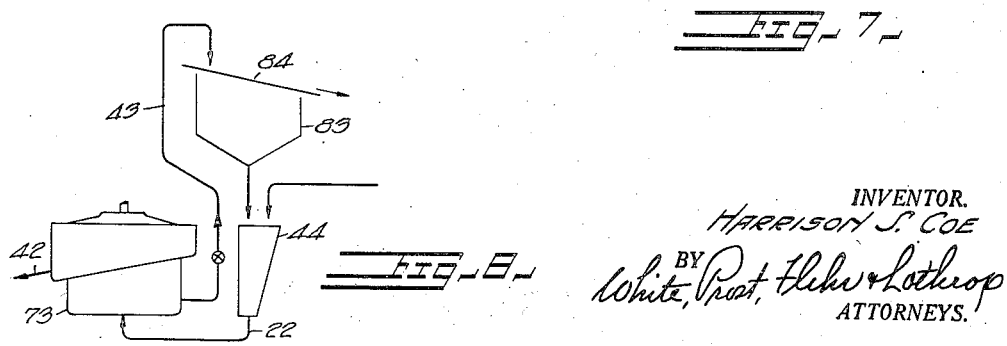

Figs. 6 to 8 inclusive are diagrammatic views illustrating systems which can utilize the apparatus of Fig. 1.

In centrifugal separating apparatus it has been customary to utilize a rotating centrifuge bowl having separate provision for the discharge of heavier and lighter separated components. With a proper construction such a centrifuge can be utilized for the separation or classification of coarser solids such as sand, from finer solids such as clay held in a liquid suspension. In some instances however the cost of such apparatus and the maintenance required is objectionable, and the results required may not warrant installations of this character. The centrifugal separating apparatus disclosed herein is characterized by the use of a stationary container rather than a rotary bowl, and swirling or rotary movement of the material in the container is accomplished by the use of a suitable rotor operating at a relatively low speed.

Referring to Fig. 1, the particular form of centrifugal separating apparatus which I have disclosed consists generally of a stationary container 10, provided with end walls 11 and 12, and which is preferably substantially circular in transverse cross section. Arranged within the container 11 there is a rotor 13 mounted upon a rotatable shaft 14. A bearing 16 has been indicated for journaling shaft 14 to rotate about a vertical axis concentric with container 11, and suitable driving means has been indicated by pulley 15.

The particular form of rotor 13 disclosed in Fig. 1 consists of a diaphragm 17 in the form of a cupped disc, mounted upon the lower end of shaft 14 and spaced with respect to bottom wall 12. For a purpose which will be presently explained a plurality of radial plates or vanes 18 are mounted upon the under side of diaphragm 17, and this diaphragm is provided with a plurality of circumferentially spaced openings 19. Vanes 18 are arranged so as to be within the space between diaphragm 17 and bottom wall 12. Conduit 22 forms means for introducing feed material into the interior of container 11, and this conduit preferably communicates thru the bottom 12 substantially axially with respect to shaft 14. Another conduit 23 can communicate thru bottom wall 12 with space 21, for a purpose which will be presently explained, and the discharge end of this conduit is preferably directed tangentially with respect to the direction of rotation of the rotor.

Top wall 11 of the container 10 is provided with an opening 24 concentric with respect to shaft 14. Extending thru opening 24 I provide suitable means for expelling a lighter separated fraction of the feed material. This expelling means can be conveniently in the form of a ring or cylindrical member 26 mounted upon shaft 14 by the spider 27, and arranged to rotate concentric with the shaft. If it is desired to recover a certain amount of the rotary energy contained in the material flowing thru cylindrical member 26, the upper or outer end of member 26 can carry a rotary bowl 28. The peripheral portion of bowl 28 is provided with discharge nozzles 29, arranged to discharge material in jets directed backwardly with respect to the direction of rotation. Material introduced into bowl 28 and not discharged thru nozzles 29, can flow over the annular wier or lip 31. The discharge of lighter material thru backwardly directed nozzles or jets not only effects a recovery of energy but also minimizes beating of air into the material.

Arranged within the container 10 and in spaced relationship with the end wall 11 there is an annular diaphragm 32, which can be conveniently mounted upon the inner end of cylindrical member 26. For a purpose which will be presently explained radially extending blades or vanes 33 are mounted upon the upper side of diaphragm 32, and are normally disposed within the space 34 between diaphragm 32 and end wall 11. In order to cause rotation of the rotor to impart swirling movement to the material within the container and between diaphragms 17 and 32, the diaphragms are shown connected by a plurality of circumferentially spaced elongated members 36. In practice as shown in Fig. 3, these members can be formed of an inner metal rod 37, covered by suitable abrasion resisting material 38 such as resilient vulcanized rubber. The complete rotor is therefore in the form of a squirrel cage, and provides a plurality of longitudinal openings or slots between the members 36.

In order to receive the lighter fraction of the feed material flowing thru cylindrical member 26, a housing 39 surrounds the upper portion of container 10 and the rotary bowl 28, and this housing is provided with a suitable cover 41. Material collected by this housing is removed thru conduit 42. The heavier fraction of the feed material separated within container 10 can be removed thru conduit 43, which communicates with the periphery of container 10, preferably adjacent the lower end thereof. As representative of suitable means for introducing the feed material thru conduit 22, this conduit is shown connected to receptacle 44 into which the feed material is discharged.

In explaining the mode of operation of the apparatus shown in Fig. 1, it will be presumed that the apparatus is being utilized for separating sand from oil well circulating mud. This feed material is continuously introduced into container 10 thru conduit 22. Assuming that rotor 13 is continuously rotated, the material fills container 10, and because of the swirling movement imparted by the rotor, the material assumes an inner surface as indicated at 46 approximating a paraboloid. Because of the centrifugal force to which the mass of rotated material is subjected, a zone of separation is maintained between diaphragms 17 and 32, and an overflow of a lighter separated fraction occurs thru cylindrical member 26 and out thru the backwardly reactive nozzles 29. The feed material introduced thru conduit 22 axially of shaft 14 is pumped outwardly by virtue of the action of rotating vanes 18 and a major portion of this feed material is introduced into the zone of separation between diaphragms 17 and 32, thru openings 19. In addition to serving as an impeller for pumping the feed material thru openings 19, vanes 18 also impart rotary energy to the feed material so that the rotary energy of this material as it is introduced thru opening 19 is approximately the same as the rotary energy of the zone of material into which it is introduced above diaphragm 17. A zone consisting of the heavier fraction separated from the feed material forms adjacent the periphery of container 10, and the hydrostatic pressure by virtue of the rotary movement of the material, effects a discharge of the heavier fraction thru conduit 43.

It is apparent that without the provision of special means, the hydrostatic pressure of material within container 10 would be sufficient to effect a flow of material thru opening 24 about cylindrical member 26, as well as thru this member. However by means of vanes 33 which rotate together with the rotor, such a discharge thru opening 24 is prevented. Rotation of these vanes imparts a rotary movement to material in space 34, thus causing this material to exert a hydrostatic pressure tending to oppose and balance the hydrostatic pressure of swirling material between diaphragms 17 and 32. As a result the surface of material in space 34, indicated at 46, is at a radial distance from the center of shaft 14 which is substantially greater than the radius of opening 24. It is obvious that in order to effect such a balance of pressures to prevent discharge of material directly thru opening 24, the rotary energy imparted to material in space 34 by vanes 33, must be substantially greater than that of an equal mass of material below diaphragm 32 and occupying substantially the same relative position with respect to shaft 14. In addition to serving as a pump to the entering feed material and for imparting rotary energy to the same, vanes 18 also serve the useful function of preventing separated material from the outer zone of container 10 from flowing back into the zone of separation thru openings 19.

It is evident that with the operation described above the rotary motion of material within container 10 causes considerable hydrostatic pressure to be exerted against the peripheral walls, and thus the centrifugal separating action can be described as taking place within a stationary pressure tank. In fact this hydrostatic pressure is ordinarily sufficient to permit the heavier fraction discharged thru conduit 43 to be delivered at a level above container 10, thus permitting continuous delivery of the treated heavier fractions from the separating means described to an elevated storage tank or other associated apparatus.

It is further characteristic of the apparatus described above and the method utilized therewith that the rate of discharge of the heavier fractions thru conduit 43 must be controlled in accordance with variations in the rate of flow and characteristics of the feed material, in order to minimize the discharge of untreated material. In order to obviate a manual control of the apparatus in this manner, it is possible to introduce an additional material into the container 10 thru conduit 23, simultaneously with introduction of feed material thru conduit 22. Various apparatuses and methods for effecting an introduction of additional material will be presently described.

Figure 4:
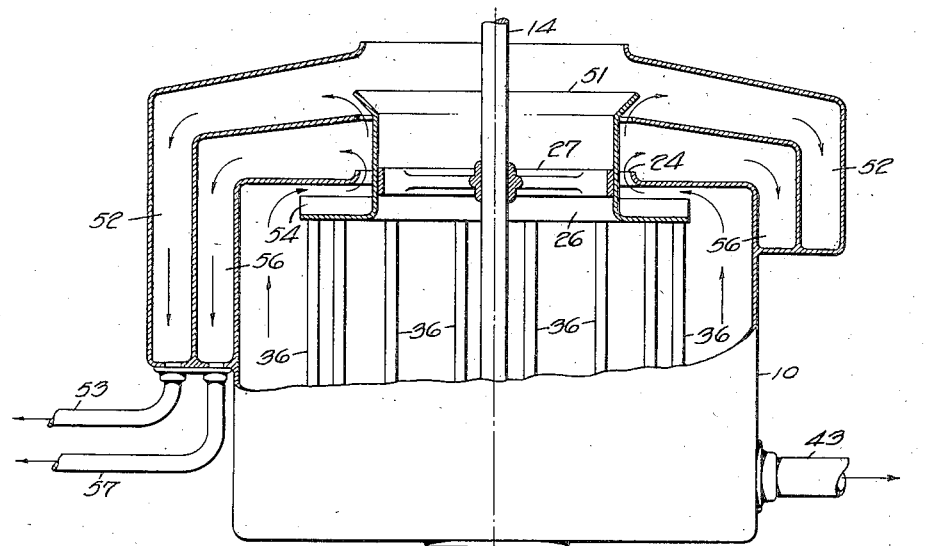
Fig. 4 is a side elevational view of centrifuge apparatus similar to that shown in Fig. 1, but with certain modifications.

In Fig. 4 there is shown a modification of the separating apparatus described with reference to Fig. 1. In this case bowl 28 has been omitted and the overflow thru the cylindrical member 26 occurs over the flange or lip 51. Receiver 52 collects the overflow and discharges the same thru conduit 53. Rotary vanes 54 in this instance are portioned to permit a controlled amount of flow directly thru opening 24 to receiver 56, from which the material can be discharged thru conduit 57.

Operation of the apparatus shown in Fig. 4 is substantially the same as that of Fig. 1, with exception that a controlled flow occurs directly thru opening 24, as well as an overflow thru cylindrical members 26. Because of the upright position of container 10, a certain degree of gravity classification occurs within the container, so that the fluid material flowing directly thru opening 24 and conducted away thru conduit 57 is substantially lighter than the fraction discharged thru conduit 43, although heavier than the overflow occurring thru cylindrical members 26. In other words assuming operation upon oil well circulating mud, the flow thru conduit 43 will contain a higher percentage of sand than flow occurring directly thru opening 24. However in both instances the rotating vanes above diaphragm 32 tend to prevent free flow from the interior of the container directly thru opening 24.

In Fig. 5 there is shown a system or arrangement of apparatus incorporating separating means such as described with reference to Fig. 1, and which will effect better control of the operation of the same. In this case conduit 43 extends to a substantial elevation and discharges the heavier separated fraction into the receptacle 61 of a specific gravity testing device. A specific gravity device which will give suitable results is disclosed herein and is disclosed and claimed in copending application No. 325,100 filed December 10, 1928. It can be described briefly as comprising the receptacle 61 which is carried by one arm of a fulcrumed beam 62. The other arm of beam 62 carries an adjustable counterweight 63. A pipe 64 having a lower open end is positioned within receptacle 61, and is in communication with a laterally extending discharge pipe 66. The discharge end of pipe 66 also merges with the discharge end of an overflow pipe 67, whereby the level of material within receptacle 61 is maintained comparatively constant. The discharge from pipes 66 and 67 is received in either one of two receivers 68 and 69, which are separated by the plate 71. Conduit 23 from the separating apparatus is connected to receiver 69, while the desired heavier fraction is removed from receiver 68.

Assuming now that the centrifugal separating means is in operation, as described with reference to Fig. 1, and that a feed material such as oil well circulating mud is being continuously introduced into container 10 thru conduit 22, the heavier fraction discharged thru pipe 43 is continuously introduced into receptacle 61. The material accumulating within receptacle 61 assumes a comparatively constant level as determined by overflow pipe 67. If the material discharged thru conduit 43 is lighter in specific gravity than that desired, receptacle 61 will assume an elevated position and all of the discharge therefrom will be delivered to receiver 69, and returned back into container 10 for retreatment. Such a return will cause the specific gravity of material delivered thru conduit 43 to be gradually increased, until the weight of material in receptacle 61 causes the same to lower to an intermediate position. Assuming that the specific gravity of material now being discharged thru conduit 43 is substantially the same as that desired, the discharge from receptacle 61 will be split between receiver 68 and 69, and only a portion of the discharge material will be returned to conduit 22. Also assuming that the specific gravity of material discharged thru conduit 43 should exceed a desired value, due for example to an increase in the percentage of sand in the feed material introduced thru conduit 22, the weight of material in receptacle 61 will cause this receptacle to move to a lower position in which all of the material discharged therefrom will be delivered to receiver 68 and removed from the system, thus temporarily interrupting return thru conduit 22. Such a condition of operation will result in a gradual decrease in the specific gravity of the material discharged thru conduit 43, until it is again at its approximate desired value, at which time receptacle 61 will return to an intermediate position and split the discharge therefrom between receivers 68 and 69.

In the system and method described above with reference to Fig. 5, the amount of material discharged thru conduit 43 is normally excessive, so that under normal equilibrium conditions a controlled amount of material is returned to container 10 thru conduit 22. It is obvious that this system and method of operation affects a control which will automatically accommodate for varying characteristics of feed material and for varying rates of flow of feed. In fact the automatic compensation is such that if the feed material for any appreciable period contains substantially no sand, all of the material discharged thru conduit 43 will be continuously returned into the receptacle. Likewise if for any appreciable period the supply of feed material to container 10 should cease entirely, the material discharged thru conduit 43 will be continuously returned into receptacle 10 to prevent clogging of the same and to prevent the necessity of a shutdown.

In Fig. 6 there is illustrated another system or arrangement of apparatus utilizing the separating means of Fig. 1 in conjunction with an auxiliary stabilizing storage tank. In this case the centrifugal separating means is indicated generally at 73, and conduit 43 discharges into the auxiliary stabilizing storage tank 74, which is placed at an elevation with respect to apparatus 73. Conduit 23 connecting to apparatus 73 forms an overflow conduit for storage tank 74. The feed material is introduced into receptacle 44 and conducted into separating apparatus 73 by conduit 22, as shown in Fig. 1. The desired heavier fraction is removed from the lower portion of tank 74 thru conduit 76. An optional pipe connection 77 is shown between conduit 43 and the lower portion of tank 74 above the point of the tank with which conduit 76 communicates.

In the system illustrated in Fig. 4, apparatus 73 is adjusted so that the material discharged thru conduit 43 contains too high a percentage of light and fine solid material to be suitable for immediate discharge. In other words assuming treatment of oil well circulating mud, apparatus 73 is operated so that the discharge thru conduit 43 contains sand mixed with a substantial quantity of clay. This material is delivered to tank 74, where a gravity classifying action takes place, the lighter classified fraction overflowing from tank 74 thru conduit 23 and back into separating apparatus 73 for re-treatment. When the material in the lower portion of tank 74 becomes sufficiently concentrated it can be removed either continuously or intermittently thru conduit 76.

In the method described above with reference to Fig. 4 tank 74 acts as a stabilizer for operation of apparatus 73. Furthermore the continual exchange of fluid material between tank 74 and apparatus 73 tends to concentrate the percentage of heavier, coarser particles in tank 74, and this concentration is also augmented by the gravity classifying action in tank 74.

In Fig. 7 the system as illustrated in which the separating apparatus of Fig. 1 is utilized in conjunction with a drag type classifier. In this case apparatus 73 delivers the heavier discharge material thru conduit 43 to the drag type classifier illustrated diagrammatically at 79. Wash water introduced as indicated at 81 carries away the lighter finer solids, with which a certain amount of the heavier solids may be entrained, and this classified fraction is then returned to apparatus 73 to conduit 23. Sand from classifier 79 is removed as indicated at 82.

The system of Fig. 8 is similar to that of Fig. 7 with exception that a vibrating screen type of classifier 83 is utilized. In this case conduit 43 discharges upon the vibrating screen 84, from which the sand or other heavier classified solid particles are removed. The lighter classified fraction from 83, which consists principally of the finer and lighter solid particles, such as clay, are introduced into container 44 together with the feed material, and thereby returned into separating apparatus 73.

In all of the systems and methods described with reference to Figs. 6 to 8 inclusive, it will be noted that the heavier fraction discharged from the centrifugal separating means or apparatus 73 is transferred to a point where it is exchanged for a fluid of lighter consistency, at least a part of which has been previously discharged thru conduit 43.

I claim:

1. In centrifugal separating apparatus, a stationary container, a rotor disposed within the container, means for supplying fluid feed material to the container, said container having an opening thru one wall of the same, fluid expeller means extending thru said opening, and means for balancing hydrostatic pressure within the container tending to cause a flow of fluid from the container between said wall and said expeller means.

2. In centrifugal separating apparatus, a stationary container, a rotor disposed within the container, means for supplying fluid feed material to the container, said container having an opening thru one wall of the same, fluid expeller means extending thru said opening, and means for balancing hydrostatic pressure within the container tending to cause a flow of fluid from the container between said wall and said expeller means, said means including vanes carried by the rotor and arranged adjacent the inner side of the said wall about said opening.

3. In centrifugal separating apparatus, a stationary container, a rotor disposed within the container, a rotatable shaft upon which the rotor is mounted, means for supplying fluid feed material to the receptacle, there being an opening thru one wall of the receptacle concentric to said shaft, expeller means carried by the shaft and extending thru said opening, said expeller means serving to discharge lighter separated components of the feed, and a plurality of vanes carried by the rotor, said vanes being disposed in the space adjacent the inner side of said wall and surrounding the expeller means.

4. In centrifugal separating apparatus, a stationary container, a rotor disposed within the container, means for supplying fluid feed material to the container, said container having an opening thru one wall of the same, expeller means extending thru said opening for the discharge of separated components, and means for effecting a controlled flow of fluid thru said opening about said expeller means.

5. In centrifugal separating apparatus, a stationary container, a rotor disposed within the container, means for supplying fluid feed material to the container, said container having an opening thru one wall of the same, expeller means extending thru said opening for the discharge of separated components, and means for effecting a controlled flow of fluid thru said opening about said expeller means, said last means including means disposed in the space adjacent the inner side of said wall and surrounding the expeller means for opposing the pressure of fluid tending to flow thru said opening.

6. In a centrifugal separating apparatus, a stationary container adapted to be supplied with fluid feed material, a rotor disposed within the container and adapted to effect a rotary motion of material within the same, said container having a wall provided with an opening concentric to the axis of rotation of the rotor, a diaphragm disposed within the container and adjacent to the inner side of said wall, and vanes rotatable together with the rotor and disposed in the space surrounding said opening between said wall and said diaphragm.

7. In a centrifugal separating apparatus, a stationary container adapted to be supplied with fluid feed material, a rotor disposed within the container and adapted to effect a rotary motion of material within the same, said container having a wall provided with an opening concentric to the axis of rotation of the rotor, a diaphragm disposed within the container and adjacent to the inner side of said wall, vanes rotatable together with the rotor and disposed in the space surrounding said opening between said wall and said diaphragm, and expeller means extending thru said opening.

8. In a method of effecting centrifugal separation within a stationary container, the steps of imparting rotary motion to material within the container thereby causing the formation of a separation zone, causing a continuous discharge of a lighter separated fraction thru an opening in one wall of the container, and imparting rotary energy to material in a space adjacent said wall and surrounding said opening in excess of the rotary energy of material in the main interior of the container.

9. In a method of effecting centrifugal separation within a stationary container, the steps of establishing a zone of centrifugal separation within the main portion of the container and spaced from the end walls thereof, and imparting rotary energy to the material in the spaces at the ends of said zone, the average amount of rotary energy in a unit mass of material in said spaces being substantially greater than the average amount of rotary energy per unit mass in said zone.

10. In centrifugal separating apparatus, a stationary container, a rotor disposed within the container and adapted to impart rotary motion to the material within the same, a diaphragm disposed within the container adjacent one end of the rotor and in spaced relationship with an end wall of the container, the space so formed between the diaphragm and said end wall being substantially annular, concentric with the axis of the rotor, and having its periphery in communication with the main part of the interior of the container, said diaphragm also having openings spaced inwardly of its periphery, means for introducing feed material into said space at a region substantially in alignment with the rotor axis, and means for imparting rotary energy to the feed material within said space whereby the fluid material is caused to flow outwardly toward said diaphragm openings, and for imparting rotary energy to fluid within that annular portion of the space extending inwardly from the periphery of the diaphragm to the region of said diaphragm openings, whereby fluid pressure from the material in the main part of the container is hydrostatically balanced and whereby feed material flows through said diaphragm openings into the main part of the interior of the container.

11. In centrifugal separating apparatus, a stationary container, a rotor disposed within the container and adapted to impart rotary motion to material within the main part of the same, a diaphragm mounted upon the rotor adjacent one end of the same, said diaphragm being substantially concentric with the axis of rotation of the rotor and being in spaced relationship with an end wall of the container, the space so formed between the diaphragm and said end wall having its periphery in communication with the main part of the interior of the container, said diaphragm also having openings spaced inwardly of the periphery of the diaphragm, means for introducing feed material into said space at a region substantially in alignment with the rotor axis, and vanes mounted upon said diaphragm and serving to impart rotary energy to material within said space, whereby feed material introduced into said space flows outwardly through the same and then through the opening in said diaphragm into the main part of the container, and whereby a hydrostatic balance is formed to prevent inflow of material from the main part of the container into said space to directly intermix with said feed material.

12. In a centrifugal separating apparatus, a stationary container, a rotor disposed within the container and adapted to impart a rotary motion to fluid material within the same, a diaphragm concentric to the axis of rotation of the rotor and disposed in spaced relationship with an end wall of the container, the space so formed having its outer circumference in free communication with the interior of the container, means for introducing feed material into said space substantially concentric with said axis, said diaphragm having openings providing additional communication between said space and the interior of the chamber, whereby feed material introduced into said space can flow through said diaphragm, and means for separately discharging lighter and heavier separated fractions from said container.

HARRISON S. COE.